(12) United States Patent
Krauss

(10) Patent No.: US 8,549,523 B2
(45) Date of Patent: *Oct. 1, 2013

(54) PERFORMING RUNTIME ANALYSIS AND CONTROL OF FOLDING IDENTIFIED THREADS BY ASSUMING CONTEXT OF ANOTHER THREAD AND EXECUTING IN LIEU OF ANOTHER THREAD FOLDING TOOL

(75) Inventor: Kirk J. Krauss, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 564 days.

This patent is subject to a terminal disclaimer.

(21) Appl. No.: 12/623,778

(22) Filed: Nov. 23, 2009

(65) Prior Publication Data

US 2011/0126202 A1    May 26, 2011

(51) Int. Cl.
*G06F 9/46* (2006.01)

(52) U.S. Cl.
USPC ............ 718/102; 718/103; 718/104; 718/107

(58) Field of Classification Search
USPC .... 718/100, 102, 103, 104, 107; 712/E9.082
See application file for complete search history.

(56) References Cited

U.S. PATENT DOCUMENTS

| | | | |
|---|---|---|---|
| 5,675,798 A | 10/1997 | Chang | |
| 6,434,590 B1 * | 8/2002 | Blelloch et al. | 718/102 |
| 7,082,601 B2 * | 7/2006 | Ohsawa et al. | 717/149 |
| 7,150,002 B1 * | 12/2006 | Anderson et al. | 717/107 |
| 7,320,065 B2 | 1/2008 | Gosior et al. | |
| 7,516,446 B2 * | 4/2009 | Choi et al. | 717/128 |
| 7,765,547 B2 * | 7/2010 | Cismas et al. | 718/100 |
| 7,958,234 B2 | 6/2011 | Thomas et al. | |
| 8,127,010 B2 * | 2/2012 | Sinha | 709/226 |
| 8,332,858 B2 | 12/2012 | Krauss | |
| 2005/0044205 A1 | 2/2005 | Sankaranarayan et al. | |
| 2007/0271381 A1 | 11/2007 | Wholey et al. | |
| 2008/0134180 A1 * | 6/2008 | Floyd | 718/100 |
| 2011/0126174 A1 | 5/2011 | Krauss | |
| 2012/0254840 A1 | 10/2012 | Krauss | |
| 2012/0254880 A1 | 10/2012 | Krauss | |

OTHER PUBLICATIONS

Utrera et al., Implementing Malleability of MPI Jobs, 2004, IEEE, PACT'04, pp. 1-10.*
Maghraoui et al., Dynamic malleability in Iterative MPI Applications, 2008, Concurrency and computation practice and expericene, pp. 1-22.*
Wikipedia, "nice (Unix)", <<http://en.wikipedia.org/wiki/Nice_%28Unix%29>>, (last visited on Nov. 17, 2009).

(Continued)

*Primary Examiner* — Abdullah Al Kawsar
*Assistant Examiner* — Abu Zar Ghaffari
(74) *Attorney, Agent, or Firm* — Cuenot, Forsythe & Kim, LLC

(57) ABSTRACT

A computer program product for performing runtime analysis on and control of a multithreaded computer program. One embodiment of the present invention can include identifying threads of a computer program to be analyzed. Under control of a supervisor thread, a plurality of the identified threads can be folded together to be executed as a folded thread. The execution of the folded thread can be monitored to determine a status of the identified threads. An indicator corresponding to the determined status of the identified threads can be presented in a user interface that is presented on a display.

9 Claims, 11 Drawing Sheets

(56) References Cited

OTHER PUBLICATIONS

Microsoft, "Analyzing Processor Activity," <<http://www.microsoft.com/technet/prodtechnol/windows2000serv/reskit/prork/pred_ana_umwv.mspx?mfr=true>>, (last visited on Nov. 17, 2009).

U.S. Appl. No. 12/623,741, Non-Final Office Action, Apr. 11, 2013, 23 pg.

U.S. Appl. No. 13/428,408, Non-Final Office Action, May 23, 2013, 17 pg.

* cited by examiner

PERFORMING RUNTIME ANALYSIS AND CONTROL OF FOLDING IDENTIFIED THREADS BY ASSUMING CONTEXT OF ANOTHER THREAD AND EXECUTING IN LIEU OF ANOTHER THREAD FOLDING TOOL

FIELD OF THE INVENTION

The embodiments of the present invention relate to real time analysis and control of a threading model of a running application program.

BACKGROUND OF THE INVENTION

As the proliferation of computers in modern society continues to grow, so too do the tasks that we delegate to them. Moreover, the complexity and size of computer programs required to perform such tasks also increases, as does the level of computer processing power required to properly execute these programs. Historically, the primary means implemented for increasing computer processing power has been to increase processor clock speed. In recent years, however, the ability to continually increase clock speeds to gain more processing power has curtailed. Thus, other avenues to improve computer performance have been adapted. One such adaptation is the use of multi-core processors. A multi-core processor is a processor that comprises a plurality of processing cores, oftentimes manufactured on a single silicon wafer.

In order to fully exploit the advantages of a multi-core processor, a computer program must be multithreaded. In contrast to traditional computer programs, which were primarily designed for serial execution using a single processing core, a multithreaded computer program comprises multiple threads of execution, generally referred to as "threads", that may be executed in parallel using a plurality of processor cores. For example, one thread can be dynamically assigned to a first processor core, another thread can be dynamically assigned to a second processor core, and so on. Accordingly, the execution power of multiple processor cores can be combined to increase the speed at which application processes are executed.

The adaptation of multithreading in computer program design has not kept pace with the adaptation of multi-core processors. Indeed, many currently available computer programs are designed to effectively use at most one or two processor cores, while four-core (i.e. quad core) processors now are widely available. The complexities involved in designing dynamic multithreading architectures that effectively use more than one or two processor cores has shown to be a primary hindrance to the adaptation of such architectures. For example, when problems induced by race conditions such as heap corruption or confused program states occur in a multithreaded computer program, it can be very difficult and cumbersome to identify which thread or threads are responsible.

BRIEF SUMMARY OF THE INVENTION

An embodiment of the present invention can include a computer program product including a computer-usable medium having computer-usable program code that, when executed, causes a machine to perform the various steps and/or functions described herein. For example, the computer-usable medium can include computer-usable program code that identifies threads of a computer program to be analyzed, computer-usable program code that, under control of a supervisor thread, folds a plurality of the identified threads together to be executed as a folded thread, and computer-usable program code that monitors the execution of the identified threads to determine a status of the identified threads. The computer-usable medium also can include computer-usable program code that presents in a user interface that is presented on a display an indicator corresponding to the determined status of the identified threads.

DETAILED DESCRIPTION OF THE INVENTION

Figure 1:
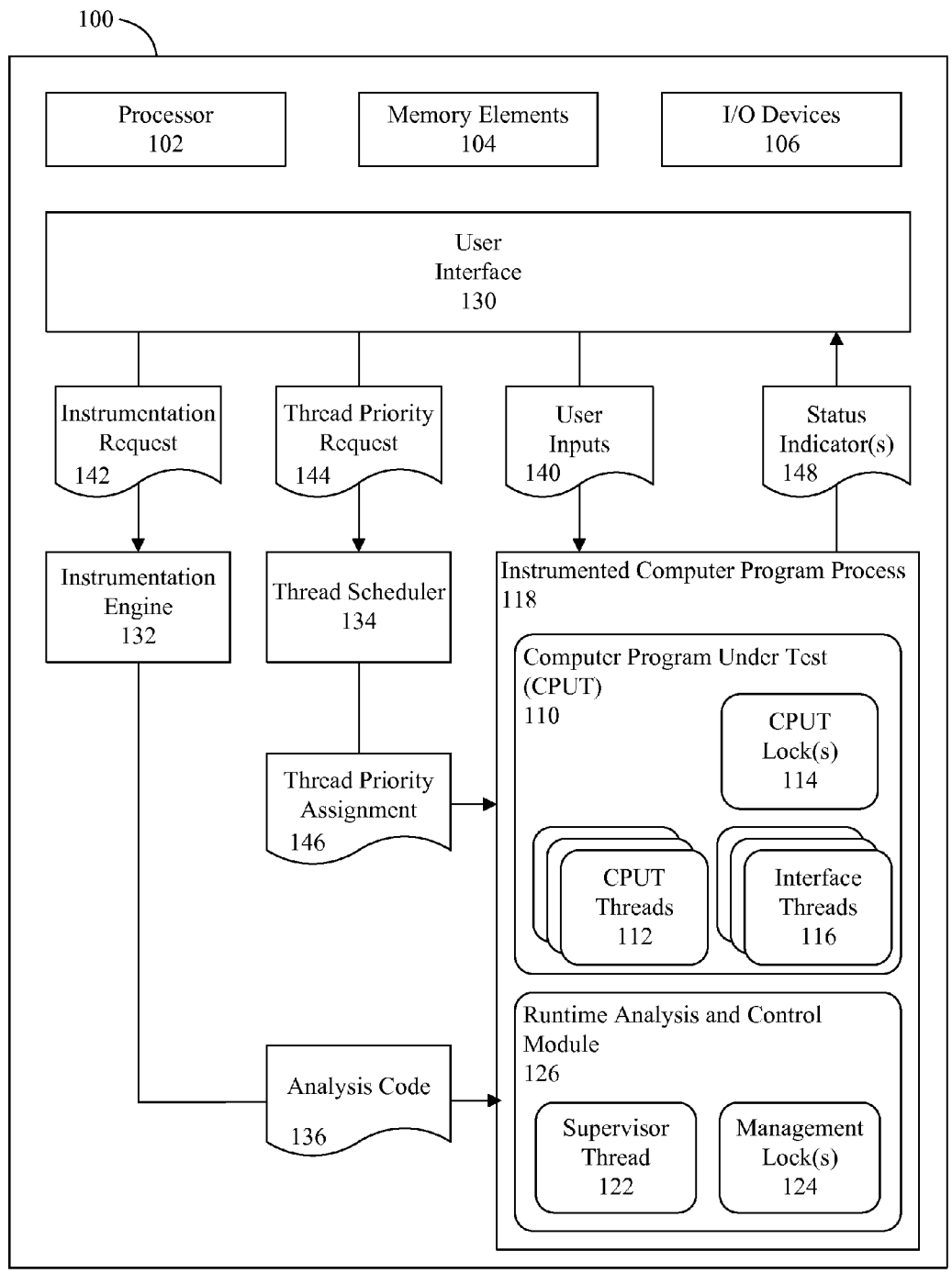
FIG. 1 is a block diagram illustrating a system for controlling execution of computer program threads in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The embodiments disclosed herein relate to controlling and monitoring execution of threads in a multithreaded computer program in order to identify and diagnose undesirable behavior of the threads. More particularly, as a multithreaded computer program under test (hereinafter "CPUT") executes, execution of the threads of the CPUT can be controlled to change the behavior of the CPUT and its threading model in useful ways. For example, via the user interface, a user can enable or disable (e.g., pause) threads, set thread priorities, and so on. Via the user interface, a user also can select a thread, or a group of threads, and serialize their execution. As used herein, threads that are serialized, or more simply "serialized threads," are threads that, during runtime analysis, are configured to execute sequentially for purposes of the analyses described herein.

In addition, information pertaining to the status of the threads can be monitored, collected, and presented to a user via a user interface. The status information can indicate threads that are enabled, threads that are disabled, thread priority levels, invocation of various functions, recorded events, and so on. The status information also can indicate the use of locks by the threads. The status information that is collected can be recorded in one or more tracking structures and displayed. For example, tracking structures can be maintained that track the current status of various threads, the use of CPUT locks, the use of management locks, recorded events, use of common resources, and so on.

Notably, the execution information that is collected can indicate those instances in which threads are performing properly, and when execution problems occur. For instance, race conditions can be identified. A race condition is a situation in which the output and/or result of an instruction or operation executed by a thread is critically dependent on the sequence or timing of other events that may occur in the course of execution of other threads. Certain race conditions can be eliminated via the present invention using one or more management techniques disclosed herein to control the execution of threads. Any race condition that is demonstrably eliminated during execution using these management techniques can be identified. A computer programmer then can eliminate the race condition programmatically, for example by rewriting or revising a portion of the CPUT's code.

FIG. 1 is a block diagram illustrating a data processing system (hereinafter "system") 100 in accordance with one embodiment of the present invention. The system 100 can be suitable for storing and/or executing program code and can include at least one processor 102 coupled directly or indirectly to memory elements 104 through a system bus (not shown). The memory elements 104 can include local memory employed during actual execution of the program code. The memory elements 104 also can include bulk storage and cache memories. Accordingly, the memory elements 104 can include system memory in which an operating system and various analysis tools can be stored. The processor 102 can execute the analysis tools, in cooperation with the operating system, to perform the various processing functions described herein. Examples of the analysis tools may include a runtime analysis and control module 126, a user interface 130, an instrumentation engine 132, a thread scheduler 134, and the like. These analysis tools will be described herein.

The system also can include input/output (I/O) devices 106 such as, for example, keyboards, displays, pointing devices, microphones, speakers, disk storage devices, tape storage devices, other memory devices, etc., which can be coupled to the system 100 either directly or through intervening I/O controllers (not shown). Network adapter(s) (not shown) also may be provided in the system 100 to enable the system 100 to become coupled to other systems or remote printers or storage devices through intervening private or public networks. Modems, cable modems, and Ethernet cards are just a few of the currently available types of network adapters.

The system 100 can be configured to perform runtime analysis on a CPUT 110. The CPUT 110 can comprise a plurality of CPUT threads (hereinafter referred to as "threads") 112 whose access to computer resources is mediated by CPUT locks 114. A thread 112 is an object of execution within a computer program and may be executed concurrently with the program's other threads. A thread can include an instruction pointer and a thread-specific stack. The instruction pointer can indicate which program instruction is currently being executed by the thread. In other words, the instruction pointer can indicate where a thread is in its instruction sequence. The thread's stack is a dynamic data structure that stores information about the active subroutines of the computer program. For example, the stack can store a return address that indicates a location where a subroutine is to return after being executed. A thread's stack also can serve additional purposes. For instance, a stack can serve as a memory space for local variables, can serve to pass parameters between subroutines executed by the thread, and so on. The conventional operation of threads, instruction pointers and stacks is well known to those skilled in the art. Notwithstanding, the present invention introduces additional thread operations that are not known in the prior art, as will be described.

One or more CPUT locks 114 can be implemented as objects or other suitable data types which are implemented to prevent simultaneous use of a common resource (e.g., a global variable or re-entrant code) by multiple threads 112. More than one thread can have a handle to the same CPUT lock 114, making inter-process synchronization possible. Another term oftentimes used for "lock" is "synchronization object." Accordingly, a synchronization object which performs the functionality of a lock as described herein will be understood by those skilled in the art to be a lock.

One common example of a CPUT lock 114 is a mutex object. A mutex object is a type of synchronization object whose handle can be specified by at least one wait function to coordinate the execution of multiple threads 112. A mutex object allows only exclusive access to a common resource by a single thread 112 at any given time. For instance, a mutex object may be used to serialize access to a common resource. If a first thread currently holds the mutex object, other threads must wait until that thread has released the mutex object before accessing the common resource. After the first thread releases the mutex object, a second thread then can acquire the mutex object, and thus access the common resource.

Another example of a CPUT lock 114 is a semaphore. A semaphore is another type of synchronization object. In contrast to a mutex object, a semaphore can allow a certain number of threads 112 (e.g., one or more threads 112) to access a common resource at a time. For example, a semaphore can maintain a count between zero and some maximum value, limiting the number of threads that may share ownership of the semaphore and thereby simultaneously access a common resource. The count can be decremented each time a thread obtains shared ownership of the semaphore, and can be incremented each time a thread releases the semaphore. The state of a semaphore can be set to be signaled when its count is greater than zero, and non-signaled when its count is zero. While the count is zero, no more threads can obtain ownership of the semaphore until its state becomes signaled. Of course, other means of tracking the use of a semaphore can be implemented. For instance, the counting operation can be reversed, and threads may only obtain ownership of a semaphore when the count is less than a certain value. Still, a myriad of other techniques can be implemented for allocating ownership of semaphores, and the invention is not limited in this regard.

To perform runtime analysis on a program, the program to be analyzed can be instrumented via a procedure that inserts additional instructions into the program to create the CPUT 110. This procedure may be referred to as "code instrumentation". When the CPUT 110 that has undergone code instrumentation is executed, the executing process can load one or more modules designated by the instrumentation procedure.

The combination of the CPUT 110 and any such additional loaded modules may be referred to as an "instrumented computer program process" 118. The instrumented computer program process 118 can include a a runtime analysis and control module 126 that can include code executed by a supervisor thread 122 or by the CPUT's own threads 112.

The supervisor thread 122 can manage the threads 112 (e.g., control the execution of the threads 112) of the CPUT 110 using one or more management locks 124. These management locks 124 also can include one or more mutex objects and/or semaphores, and are in addition to any other CPUT locks 114 provided in the CPUT 110. In accordance with the inventive embodiments described herein, a management lock 124 may be controlled by a user for runtime analysis of the CPUT 110.

The supervisor thread 122 can be used to prioritize execution of the threads 112, track execution of the threads 112, track usage of the CPUT locks 114, and so on. For example, an application program interface (API) (not shown) can be provided to receive or programmatically control user inputs 140 and, based on these user inputs, assign and/or adjust priorities of the threads 112, serialize thread execution, etc. The supervisor thread also can receive user inputs for assigning management locks 124 to the threads 112, as well as track the usage of the management locks 124.

The functions described herein that are performed by the supervisor thread 122 and the CPUT's threads 112 can be implemented in real time. As used herein, the term "real time" means a level of processing responsiveness that a user or system senses as sufficiently immediate for a particular process or determination to be made, or that enables the processor to keep up with some external process.

As noted, the system 100 further can include a user interface 130, an instrumentation engine 132 and a thread scheduler 134. The thread scheduler 134 may be supplied as part of the operating system on which the instrumented computer program process 118 is running, or it may be provided as part of the runtime analysis module. The user interface 130 can be implemented as a graphical user interface, as a text based user interface (e.g., a command prompt based interface), or as any other suitable user interface which receives user inputs. The user inputs may be inputted as menu/icon/button selections, alphanumeric entries, spoken utterances, or in any other suitable manner.

In response to receiving an instrumentation request 142 from a user via the user interface 130, the instrumentation engine 132 can perform code instrumentation and thereby insert analysis code 136 into the CPUT 110 as appropriate. The code instrumentation can be performed on the CPUT 110 in any suitable manner, for example using techniques known to the skilled artisan.

The thread scheduler 134 can receive a thread priority request 144 from a user via the user interface 130 and, in response, generate a corresponding thread priority assignment 146. The thread priority assignment 146 can specify the priority level that is assigned to one or more of the threads 112. During execution of the instrumented computer program process 118, priority levels programmatically assigned to various threads 112 of the CPUT 110 can be evaluated. Those threads 112 with the highest priority levels can be granted priority over other threads 112. For example, if a first thread 112 of the CPUT 110 has higher priority than a second thread 112, a management lock 124 can lock a particular common resource being used by the first thread 112 until the first thread's execution is completed.

Moreover, thread priorities can be analyzed and, based on these priorities, a decision can be made on how to schedule the threads. A higher priority thread will typically receive more processor resources than a lower priority thread. For example, as those skilled in the art will appreciate, the thread scheduler 134 can assign time slices more frequently to a thread of relatively high priority than to threads of relatively low priority. In accordance with the embodiments described herein, a thread can be assigned a higher priority than it would otherwise have. This assignment of priority can be implemented either by directly setting the priority of a thread 112 or by modifying how the CPUT 110 assigns thread priorities, which can happen at any time while the thread 112 runs.

In operation, the instrumented computer program process 118 can communicate status indicators 148 to the user interface 130 for presentation to the user. The status indicators 148 can identify various threads 112 and corresponding status information. The status indicators 148 can indicate, for example, which threads 112 are waiting (i.e., prevented from executing) and which threads 112 are not waiting (i.e., available for execution). Other status indicators 148 can indicate threads 112 that are selected for serialization, threads that are holding CPUT locks 114 or management locks 124, threads that are waiting for CPUT locks 114 or management locks 124, thread priority levels, and so on.

The status indicators 148 can be presented in the user interface 130. For example, the status indicators 148 can be presented in one or more thread tracking lists or as data formatted in any other manner which enables the user to track the status of threads 112 of the CPUT 110, CPUT locks 114, management locks 124, recorded events and/or any other desired information.

When the CPUT 110 is instantiated, it will typically begin with one thread 112. As the thread executes, that thread can create and terminate other threads 112. New threads 112 can be created via API calls. These API calls can be intercepted by the runtime analysis and control module 126 in order to record identification information about the threads 112 (e.g., the call chain that led to a thread's creation, the start function that was specified for the thread, etc.) in a list or set of tracking structures associated with those threads 112. When a new thread 112 starts, the thread can execute "thread attach logic" in every module loaded in the CPUT 110, including the runtime analysis and control module 126, before the thread 112 reaches a thread start function specified in the API call via which the thread 112 was launched.

When a thread 112 terminates, a thread termination API call from the CPUT 110 can be intercepted, or thread detach logic can be identified in the runtime analysis and control module 126. In one embodiment, both of these operations can be performed. A tracking structure associated with the terminated thread 112 then can be removed from a corresponding list or set of thread tracking structures, or can be updated to indicate that the thread has been terminated. These thread tracking procedures can be executed in the same process as the CPUT 110, for example using the threads 112.

As noted, the user interface 130 can be used to receive user inputs 140, and to present status indictors 148 to the user. Accordingly, the user interface 130 facilitates a high level of user interaction for controlling the execution of threads 112 and monitoring their status. In one embodiment, the user interface 130 can be instantiated in a dedicated process. Accordingly, the CPUT 110 will not be hampered with user requests for navigating within the user interface, or the like.

In one embodiment, the runtime analysis and control module 126 can add one or more interface threads 116 to the CPUT 110. An interface thread 116 can be configured to process requests from the user interface 130. For example, the interface thread 116 can monitor a port, a pipe, or any other communication medium over which messages may be communicated between the runtime analysis and control module 126 and the user interface 130. When the interface thread 116 receives such messages, the interface thread 116 can process them accordingly. Examples of such messages include, but are not limited to, messages that change the priority of a thread 112, disable a thread 112, enable a thread 112, serialize a thread 112, fold threads 112, and so on.

Thread priority changes are typically arranged via API function calls in which new thread priorities can be specified for the indicated threads. In one embodiment, the instrumentation engine 132 can arrange for such API function calls to be intercepted such that the runtime analysis and control module 126 can choose whether or not to execute the API functions. The choice of whether or not the thread priority change will occur can be user-directed.

For example, a "freeze thread priority" checkbox or button can be assigned to each thread 112 that is represented in the user interface 130. If the user elects to freeze a given thread's priority, then the user interface component can signal an interface thread 116 or a supervisor thread 122 running in the CPUT process. A routine in the runtime analysis and control module 126 can be invoked by this thread in response to this signal from the user interface 130. This routine can look up a tracking structure corresponding to the user-specified thread 112 whose priority is to be frozen and can set an indicator, such as a flag, in that thread tracking structure.

Any calls to API functions intended to change thread priorities also can be intercepted such that execution is diverted to an intercept routine in the runtime analysis and control module 126. That intercept routine can look up the tracking structure for the thread whose priority is to be changed via the intercepted API function. The intercept routine can check the indicator in that thread tracking structure to determine whether the user has elected to freeze the thread's priority. If so, then the API function call can be faked, such that it does not actually occur. Specifically, the intercept routine can return control to the CPUT routine that ostensibly invoked the API function, so that CPUT execution continues as though that API function had returned successfully.

An interface thread 116 also can be provided to monitor the status information associated with the threads 112, and send this information to the user interface 130 for presentation in a user-viewable form. This interface thread 116 can be started when the runtime analysis and control module 126 is instantiated. The interface thread 116 can be terminated when the runtime analysis and control module 126 is unloaded from the system 100, or when the user elects to stop either the interface thread 116 alone or the runtime analysis and control procedures altogether. These user elections can be received as user inputs via the user interface 130.

Figure 2:
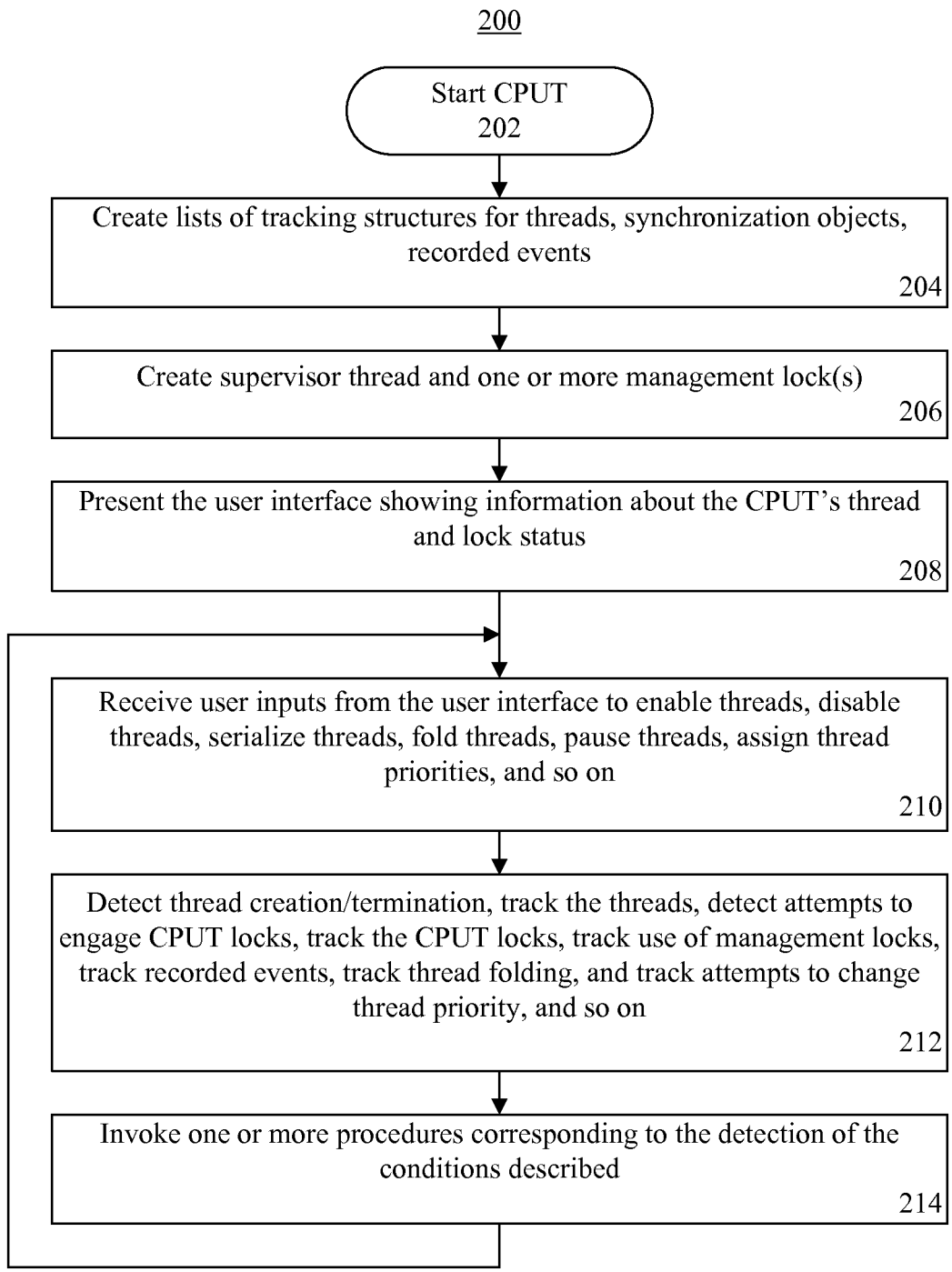
FIG. 2 is a flowchart illustrating a method of instrumenting a computer program under test (CPUT) and monitoring CPUT execution in accordance with another embodiment of the present invention.

FIG. 2 is a flowchart illustrating a method 200 monitoring execution of an instrumented CPUT 110 in accordance with another embodiment of the present invention. At step 202, the CPUT can be started. At step 204 various lists can be created for monitoring the execution of threads and performing runtime analysis of the threads. As noted, these lists can include any of a variety of thread tracking structures and tracking information. For example, the lists can indicate the status and runtime analysis configuration of threads (e.g., indicate whether the threads are serialized).

As used herein, a recorded event is an object that tracks an actual change of thread state or some other activity that occurs during the lifetime of a thread. For example, when a function is invoked by a thread 112, a recorded event tracking structure indicating the fact that a function was called by that thread 112 can be tracked in an event list, which can be specific to that thread 112. The thread's entry into a waiting state can also be tracked as a recorded event in the event list.

In one embodiment, the tracking structure for a particular thread can be created when the thread executes thread attach logic. The thread tracking structure can be stored in a tree data structure, such as a B-tree, or in a suitable type of list. In another embodiment, thread-local storage can be allocated. The thread-local storage can maintain a pointer to the thread's tracking structure. The thread can use the pointer to access the thread tracking structure in real time.

At step 206, a supervisor thread and one or more management locks (e.g., management semaphores or mutex objects) can be created. For example, the management locks can be specified in the instrumentation process and made part of the instrumented computer program process 118. The supervisor thread can begin running when it is created. At step 208 a user interface showing the threads 112 of the CPUT and their lock status can be presented. Information about the CPUT can be output to the user interface for presentation to a user, for example in lists and/or thread and lock state data fields that are created or in any other suitable user interface fields.

At step 210, user inputs can be received from the user interface to enable threads, disable threads, serialize threads, assign thread priorities, assign management locks, and so on. Thread priority levels also can be assigned by a user in any suitable manner, for instance as previously described.

At step 212, thread creation and termination can be detected and tracked. In illustration, an identifier for relevant threads can be output to the user interface for presentation to a user, for example using a table or list showing an entry for each thread. The status of these threads also can be tracked and output to the user interface for presentation in a suitable manner, for example using identifiers, status indicators and/or icons. In one embodiment, only information for threads that currently exist is presented in the user interface, though this need not be the case. In such an embodiment, when a thread is terminated, its identifier and status indicators can be removed from the lists and tables presented via the user interface and/or from the list or tree of thread tracking structures that store this tracking information for use by the analysis and management procedures described herein.

Further, the CPUT's locks and attempts to engage the locks can be detected and tracked. For example, identifiers and/or handles for the synchronization objects, as well as any other suitable identifiers, can be tracked for use by the analysis and management procedures described herein. Corresponding status indicators and/or flags can be presented in a suitable synchronization object list via the user interface. The triggering of updates to the user interface can be based on recorded events associated with these synchronization objects. The use of locks by the threads 112 also can be tracked and corresponding information can be communicated to the user interface. Thread serialization and parallelization, as well as attempts to change thread priority, also can be tracked. Moreover, any other activity of the CPUT can be tracked and/or invoked, and the invention is not limited to these examples.

At step 214, any such procedures implemented as part of the runtime analysis and control module 126, or as part of any other routines running on the system, can be invoked. Such procedures can be those corresponding to the detection of thread creation, termination, or other events. The procedures also can be those corresponding to lock creation, engagement, disengagement, and thread serialization, thread parallelization, thread folding, switching of folded threads, and thread priority changes, and so on. Certain ones of these procedures are described below. The method 200 can return to step 210 and continue while the CPUT continues to run.

The flowcharts presented in subsequent figures present various runtime analysis procedures that may be invoked at step 214 in accordance with various embodiments of the present invention. As will be described, these procedures can track a variety of CPUT operations and present corresponding information to the user via the user interface, thereby facilitating runtime analysis on the CPUT. Moreover, user inputs can be received in real time to control execution of the CPUT, thus providing a high level of user interactivity for managing the execution and evaluating the various operations implemented by the CPUT, especially with respect to multithreaded operations.

Figure 3:
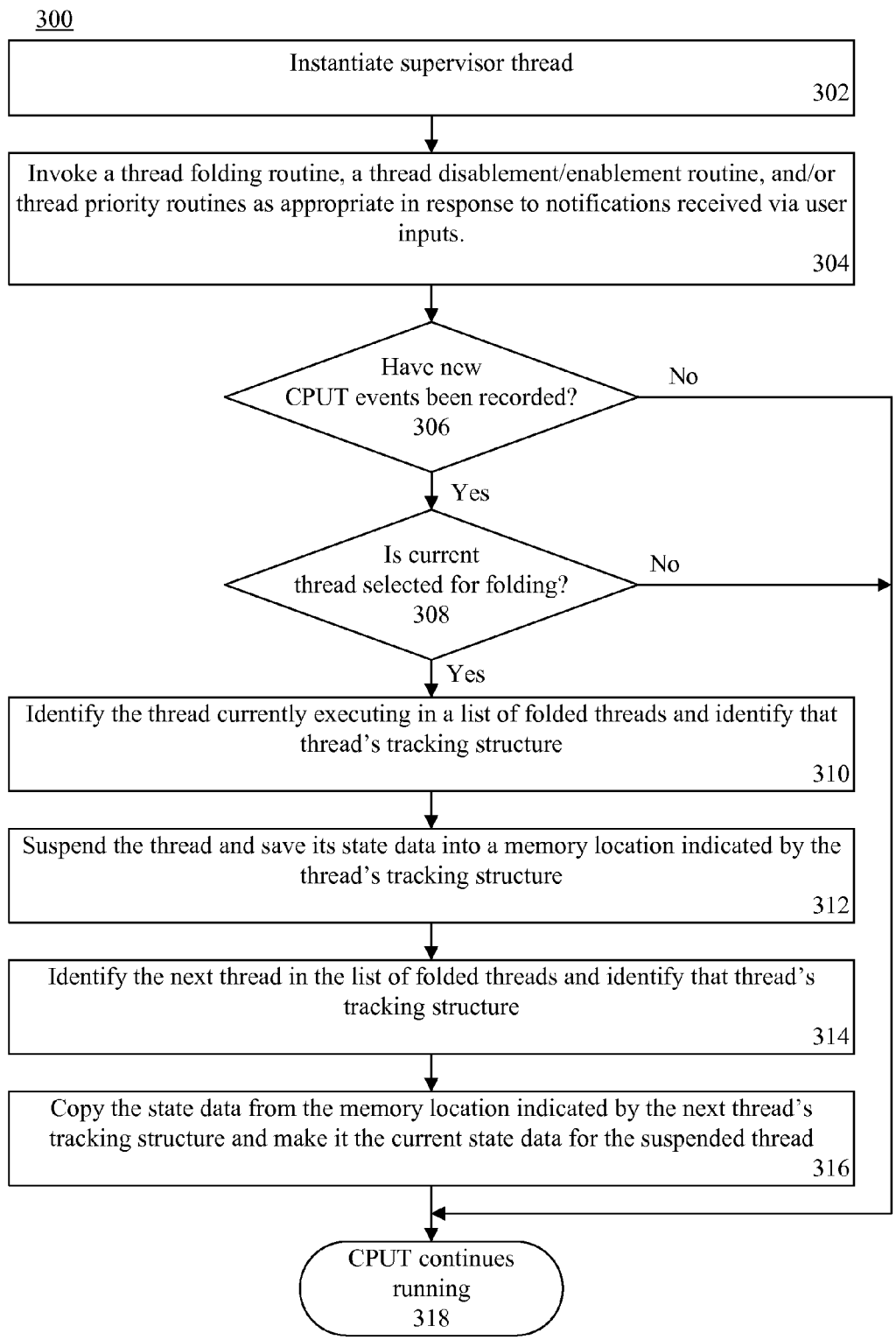
FIGS. 3-12 are flowcharts illustrating various methods of monitoring CPUT execution in accordance with other embodiments of the present invention.

FIG. 3 is a flowchart illustrating a method 300 of monitoring CPUT execution and task switching among and between folded threads in accordance with another embodiment of the present invention. The method 300 can be implemented to control thread execution in accordance with the present arrangements described herein. The method 300 can be implemented while the CPUT continues to run.

At step 302, a supervisor thread can be instantiated. At step 304, various routines, such as those which will be described herein, can be invoked as appropriate in response to user inputs that are received. For instance, a routine can be invoked to fold threads, disable threads (e.g., pause threads), enable threads, set thread priority levels, freeze thread priority levels, and so on.

At decision box 306, a determination can be made as to whether any new CPUT events have been recorded. If so, at decision box 308 a determination can be made as to whether the current thread has been selected for folding. If the current thread has been selected for folding, at step 310 the current thread can be identified in a list of folded threads. In addition, that thread's tracking structure can be identified.

At step 312, the thread can be suspended and its state data can be saved into memory. For instance, the state data can be saved to a memory location identified by the thread's tracking structure. At step 314, a next thread in the list of folded threads can be identified and that thread's tracking structure can be identified. If the prior thread was at the end of the list, the thread identified as being the next thread can be a thread that is at the top of the list.

At step 316, the state data for the next thread in the list of folded threads can be copied and used as the current state data of the suspended thread. For example, when the next thread is selected, its thread tracking structure can indicate a memory location in which that thread's state data is stored. That indication can be used to access the thread's state data. Further, since that state data is copied in order to be used as current state data for the suspended thread, the thread tracking structure for the suspended thread can be updated to indicate where the copied state data is located. State data that is copied can include the thread's instruction pointer, stack pointer, other registers, thread local storage data area, and similar state data for the suspended thread. All of the suspended thread's state data can be overwritten by the saved state data for the next folded thread that is to execute. At step 318, the CPUT can continue running.

Figure 4:
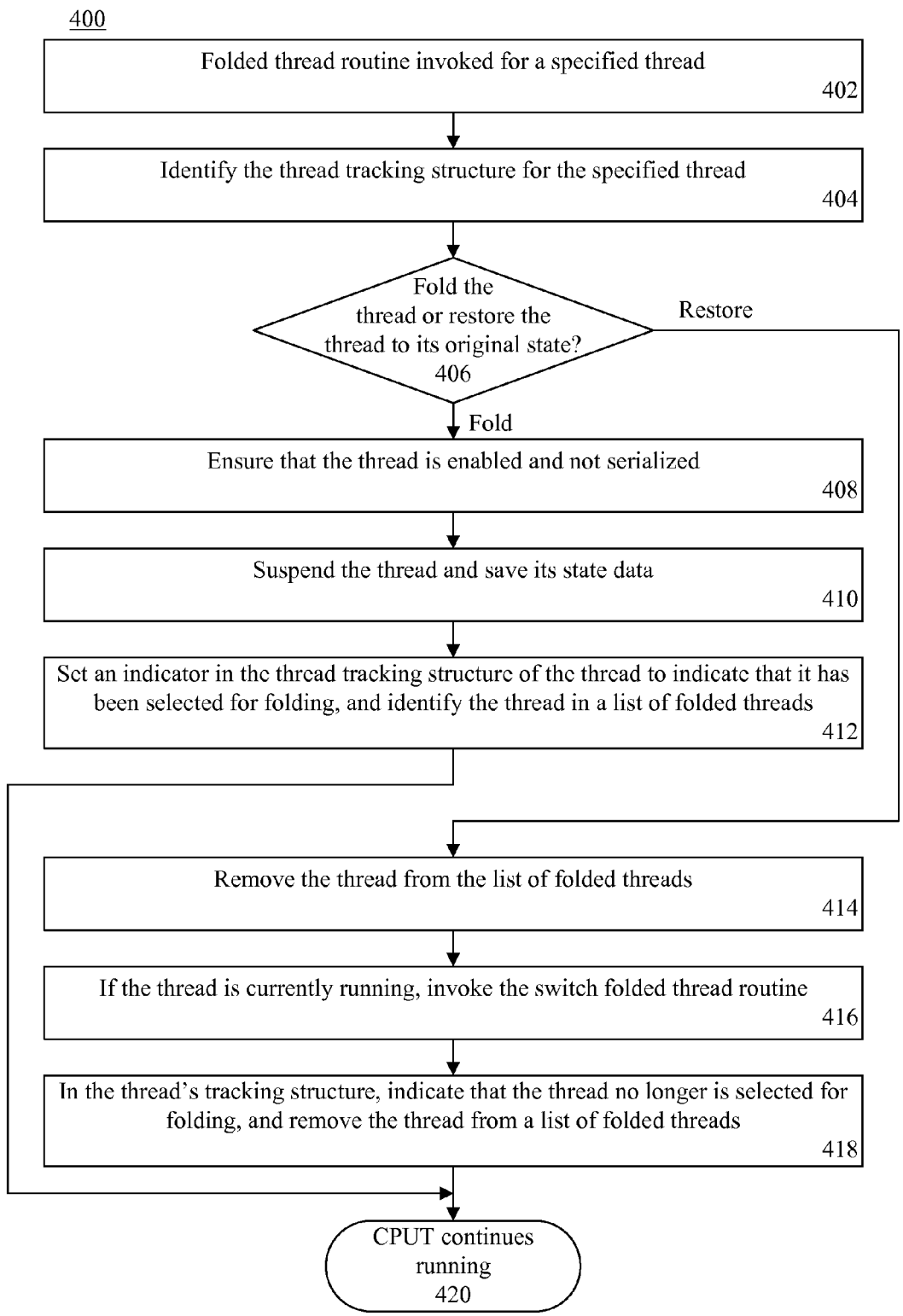

FIG. 4 is a flowchart illustrating a method 400 of selecting a thread for folding in accordance with another embodiment of the present invention. At step 402, a folded thread routine can be invoked for a specified thread. At step 404, the thread tracking structure of the identified thread can be identified. Referring to decision box 406, a determination can be made whether to fold the specified thread with another thread, or to restore the thread to its original state. For example, if the specified thread is already folded, then when the present routine is invoked it may be assumed that the thread is to be returned to its original state in which, for example, scheduling of the thread is arranged by the operating system. If, however, the specified thread is not already folded when the present routine is invoked, then it may be assumed that the thread is to be folded.

If the thread is to be folded, at step 408 the routine can ensure that the specified thread is enabled and not serialized. For example, if the specified thread is disabled, the routine can automatically enable it. If the specified thread is serialized, the routine can automatically remove the specified thread from a list of threads that are serialized. As used herein, threads that are serialized, or more simply "serialized threads," are threads that, during runtime analysis and control, are configured to execute sequentially for purposes of the analyses described herein.

At step 410, the specified thread can be suspended and its state data can be saved, for instance as previously described. At step 412, an indicator in the thread's tracking structure can be set to indicate that the thread has been selected for folding. In addition, the thread can be identified in a list of folded threads. For instance, a corresponding identifier can be added to the list. At step 420, the method 400 can return to the supervisor thread routine of FIG. 2. When a new CPUT event is detected, the method 300 of FIG. 3 can be invoked to implement switching of folded threads.

Referring again to decision box 406, if the specified thread is to be restored to its original state, at step 414 the specified thread can be removed from the list of folded threads. At step 416, if the thread is currently running, the switch folded thread routine of FIG. 3 can be invoked. At step 418, an indication can be provided in the thread's tracking structure to indicate that the thread is no longer selected for folding. For example, a corresponding flag can be cleared. In addition, the thread can be removed from the list of folded threads. For example, an identifier corresponding to the thread can be removed from the list of folded threads. At step 420, the CPUT can continue running.

Figure 5:
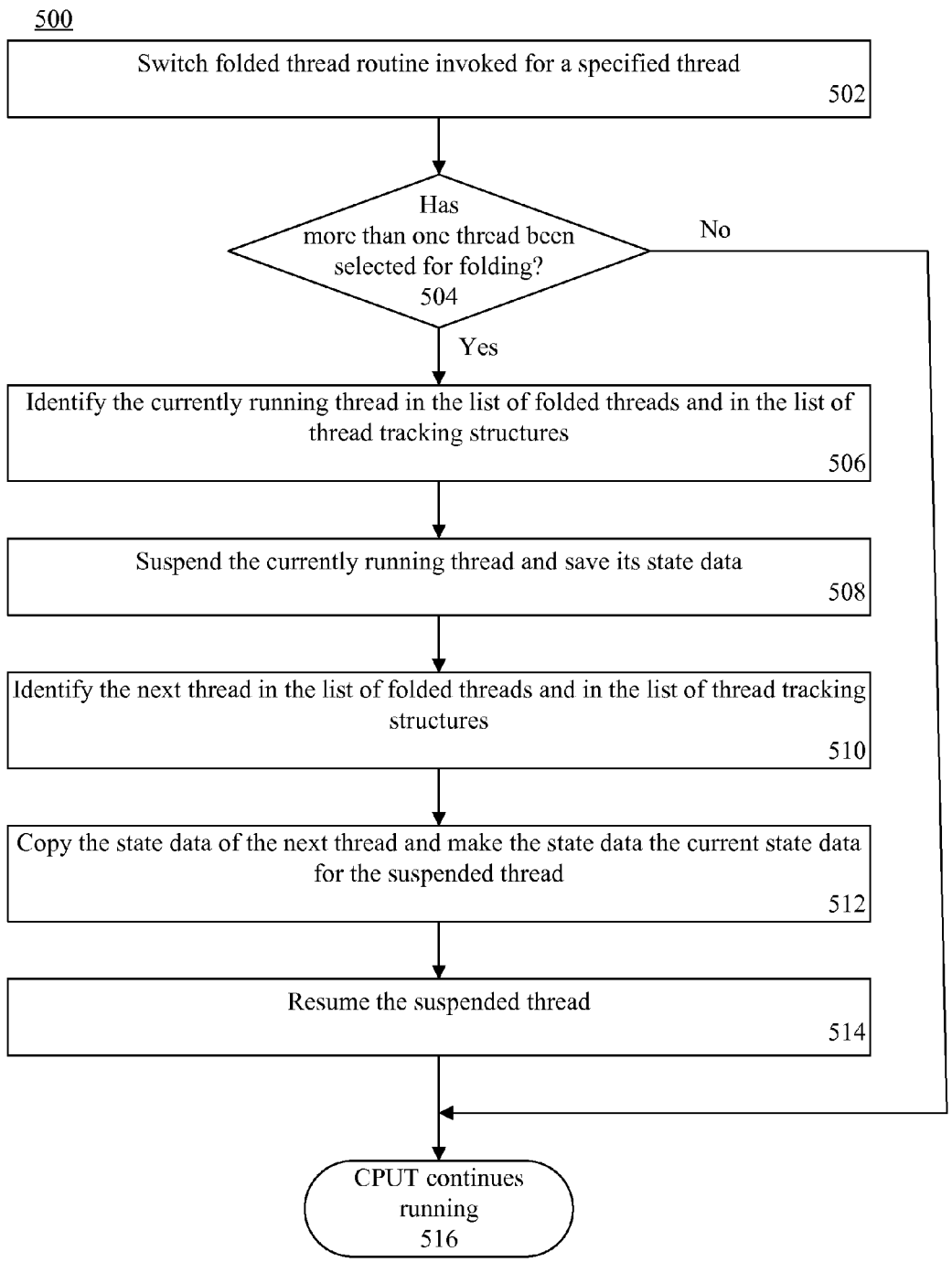

FIG. 5 is a flowchart illustrating a method 500 of switching among and between specified folded threads in accordance with another embodiment of the present invention. At step 502, a switch folded thread routine can be invoked for specified threads. At decision box 504, a determination can be made as to whether more than one thread has been selected for folding. If not, the CPUT can continue running at step 516.

If, however, more than one thread has been selected for folding, at step 506 a currently running thread can be identified in the list of folded threads and in the list of thread tracking structures. At step 508, the currently running thread can be suspended and its data can be saved. For example, the data can be saved into a memory location referenced by a memory location identifier contained in the thread's tracking structure.

At step 510 a next thread in the list of folded threads and the list of thread tracking structures can be identified. If there are no further folded threads in the list of folded threads, the first thread in the list of folded threads can be selected as the next thread.

At step 512, the state data of the next thread that was identified can be copied and made to be the current state data of thread that was just suspended. For example, the state data of the next thread can be retrieved from a memory location referenced by a memory location identifier contained in the next thread's tracking structure, and that data can be copied to overwrite the state data of the thread that was suspended. In particular, the copied data can include an instruction pointer, a stack pointer, other registers, a TLS data area, and any other actual thread state data from the next thread.

At step 514, the suspended thread can be resumed using the state data copied from the next thread. Accordingly, when the suspended thread resumes, that thread can execute as a substitute for the next thread, which meanwhile can remain suspended. Thus when multiple threads are selected for folding, one of them can be suspended temporarily so that it can take on the state of all folded threads in a sequential manner. For example, a first thread can take the state of a second thread and execute, then take the state of a third thread and execute, and so on. From the point of view of the operating system, the other folded threads remain suspended indefinitely (until they are no longer selected for folding).

In one embodiment, an entire thread local storage data area can be copied to the thread that gets to run. That thread's own thread local storage data can be saved into a backup buffer referenced by the thread's tracking structure similar to the manner described at step 508. In another embodiment, just a pointer to the thread local storage data area can be copied. On some operating systems, it may be necessary to copy fiber local storage data as well. Still, any other form of thread and task serialization can be implemented so as to ensure that different tasks that were programmatically assigned to run on different threads will instead all run on the same thread.

At step 516, the CPUT can continue running

Figure 6:
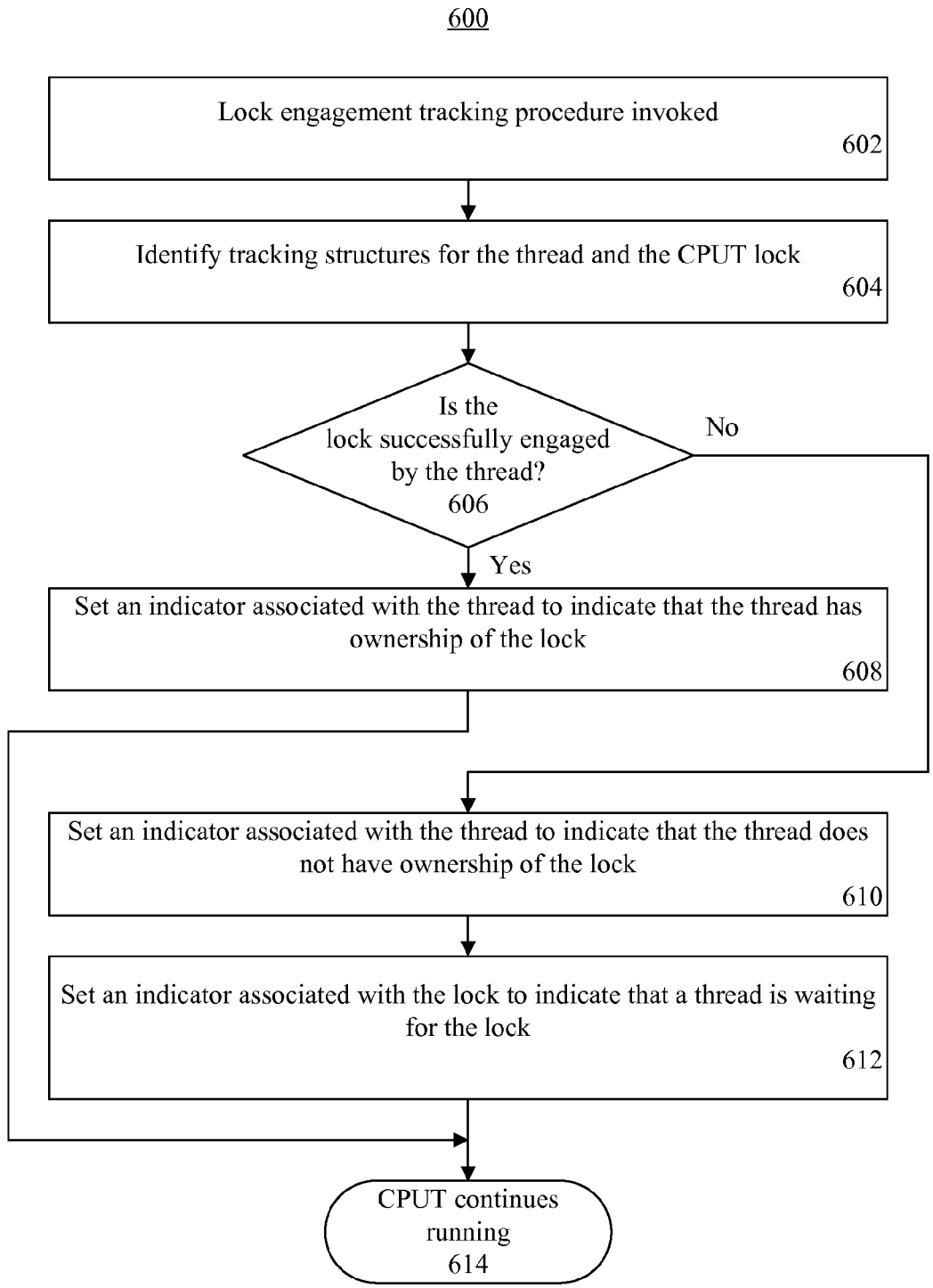

FIG. 6 is a flowchart illustrating a method 600 of monitoring CPUT execution in accordance with another embodiment of the present invention. The method 600 can be implemented to track engagement of the CPUT's locks by threads using those locks while the CPUT continues to run.

At step 602, a CPUT lock engagement tracking procedure can be invoked in response to an attempt by a thread to engage a synchronization object. This can be implemented by inserting code at the call site of a synchronization API function. For example, on a MICROSOFT® WINDOWS® operating system, code can be inserted at or near the call site to an EnterCriticalSection( ) API function call. Any and all calls by the CPUT to the relevant API functions can be intercepted via code inserted during the instrumentation phase. The insertion of code also can be implemented in any other manner suitable for an operating system or operating systems in which the CPUT is being developed, and the invention is not limited in this regard.

At step 604, a tracking structure for the thread can be identified. A tracking structure for the relevant CPUT lock also can be identified. Referring to decision box 606, if the CPUT lock is engaged by the thread, at step 608, an indicator, such as a flag, associated with the thread can be set to indicate that the thread has engaged the CPUT lock. If the CPUT lock is not engaged by the thread, at step 610, an indicator associated with the thread can be set to indicate that the thread does not have ownership of the lock. At step 612, because a thread that failed to acquire a CPUT lock is typically waiting for another thread to disengage the CPUT lock, an indicator associated with the thread can be set to indicate that the thread is waiting for the CPUT lock. The indicators set at step 608 or steps 610 and 612 can be tracked in the thread tracking structure identified at step 602 and can be used for purposes as needed by the various runtime analysis and control procedures described herein. The indicators also can be presented to the user in a user-viewable form via the user interface. At step 614, the CPUT can continue running.

Figure 7:
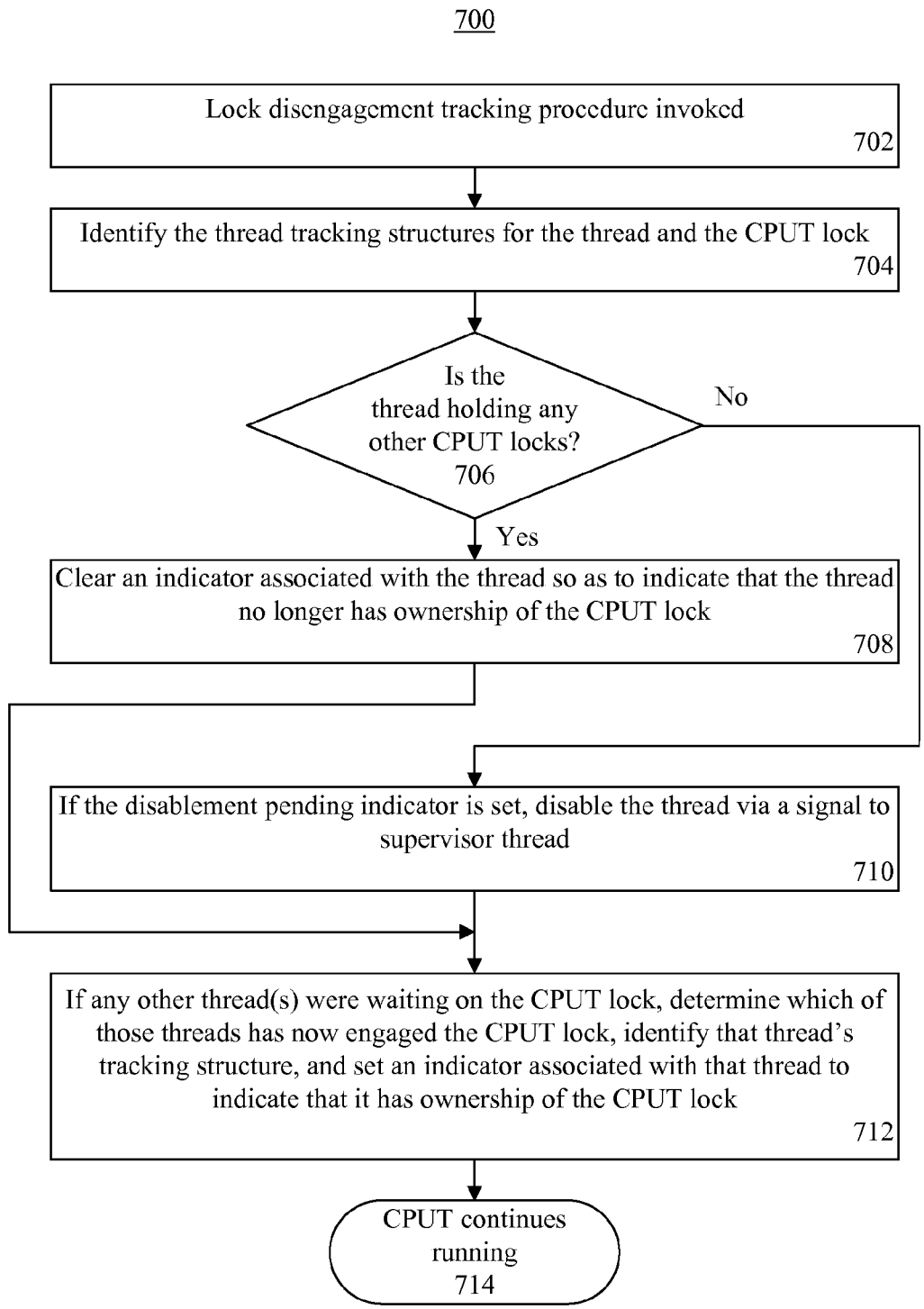

FIG. 7 is a flowchart illustrating a method 700 of monitoring CPUT execution in accordance with another embodiment of the present invention. The method 700 can be implemented to track disengagement of synchronization objects by the threads 112 that have engaged them. Again, the tracking procedure can be invoked by step 214 of FIG. 2 and can be implemented while the CPUT continues to run. Alternately, the tracking procedure can be invoked by means of inserted code at the function's entry point or call site.

At step 702, the tracking procedure can be invoked in response to an attempt by a thread to disengage a synchronization object. This can be implemented by inserting code at the call site of a synchronization API function. For example, on a MICROSOFT® WINDOWS® operating system, code can be inserted at or near the call site to a LeaveCriticalSection( ) API function call. Any and all calls by the CPUT to the relevant API functions can be intercepted via code inserted during the instrumentation phase. Of course, the tracking procedure can be invoked in any other manner suitable for an operating system or operating systems in which the CPUT is being developed.

At step 704, a tracking structure for the thread can be identified. A tracking structure for the CPUT lock also can be identified. At step 706, a determination can be made as to whether the thread is holding any CPUT locks 114 other than the CPUT lock identified at step 704. If the thread is holding other CPUT locks 114, then at step 708 an indicator, such as a flag, that is associated with the thread, can be cleared in the thread tracking structure for use by other procedures described herein. Clearing of the indicator can be used to indicate that the CPUT lock is no longer engaged by the thread. If the thread is not holding other CPUT locks, and if the thread disablement pending indicator is set (which will be described at step 1106 of FIG. 11), then at step 710, the thread can be disabled.

In any case, at step 712, the information from the various tracking lists described herein can be used to determine whether any other threads have been waiting to acquire the CPUT lock. If so, then a check can be performed via techniques known to those skilled in the art to determine which of those waiting threads has now acquired the CPUT lock. A tracking structure for that thread can be identified, and within that tracking structure an indicator can be set to indicate that thread has ownership of the CPUT lock. The indicators associated with steps 708 and 710, which are tracked in the thread tracking structure identified at step 704, also may be used for purposes as needed by the various runtime analysis and control procedures described herein. The indicator associated with step 712 can be tracked in a similar thread tracking structure that is associated with a different thread and also can be used for runtime analysis and control purposes. All of these indicators also can be presented to the user in a user-viewable form. At step 714, the CPUT can continue running. For example, the CPUT can continue to run its own code and/or the routine can return to step 210 of FIG. 2.

Figure 8:
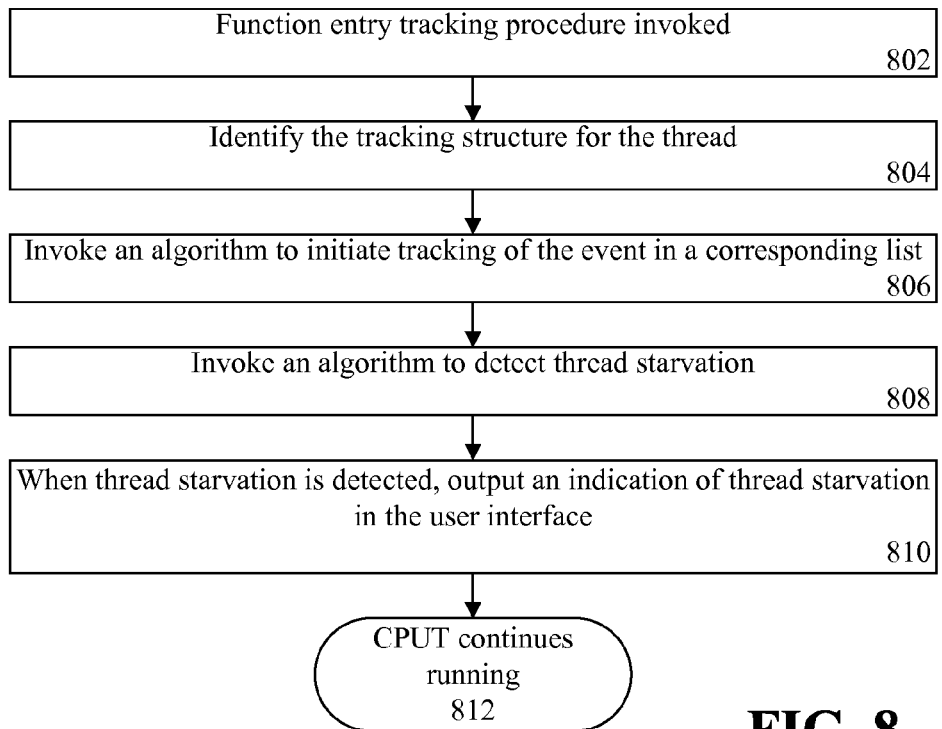

FIG. 8 is a flowchart illustrating a method 800 of monitoring CPUT execution in accordance with another embodiment of the present invention. The method 800 can be implemented to detect and track function entry by a thread.

At step 802, a function entry tracking procedure can be invoked. At step 804, a tracking structure for the thread can be identified. At step 806, an algorithm can be invoked to initiate tracking of the function entry event in an event list. Events that have become stale (e.g., not used within a particular period) can be deleted from the list. At step 808, an algorithm can be invoked to detect thread starvation (e.g., detect when the thread has been prevented from executing for a predefined period). At step 810, when thread starvation is detected, an indicator can be output to the user interface to indicate to the user whether the thread has been starved. At step 812 the CPUT can continue running.

Figure 9:
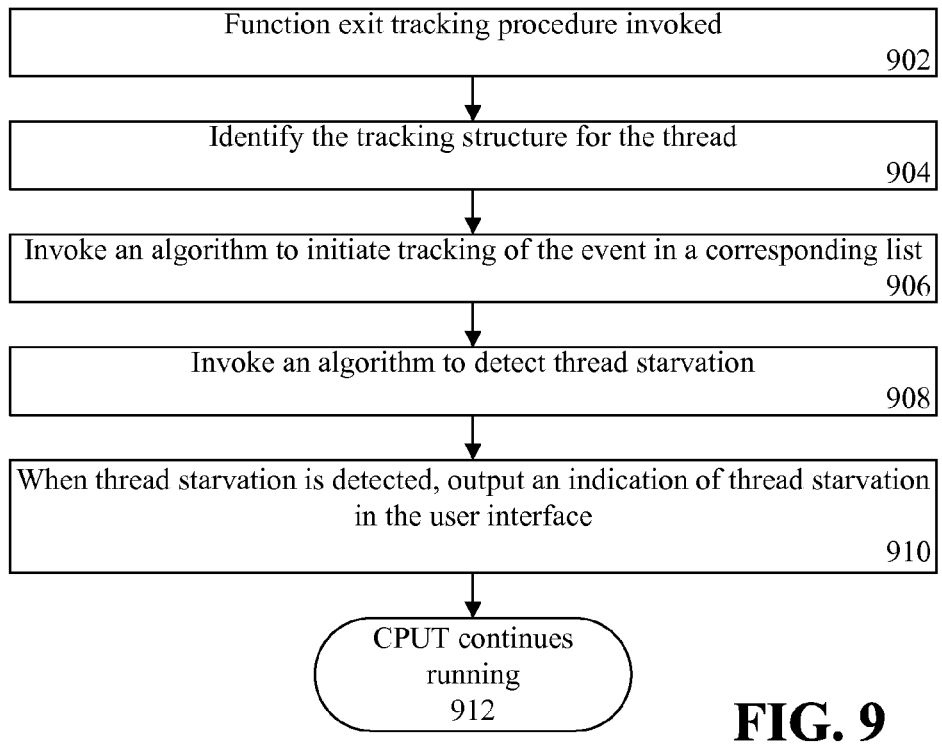

FIG. 9 is a flowchart illustrating a method 900 of monitoring CPUT execution in accordance with another embodiment of the present invention. The method 900 can be implemented to detect and track exits from functions.

At step 902, a function exit tracking procedure can be invoked. At step 904 a tracking structure for the thread can be identified. At step 906, an algorithm can be invoked to initiate tracking of the function exit event in an event list, which may be the same list associated with step 606 of FIG. 6, or which can be a different event list. Events that have become stale (e.g., not used within a particular period) can be deleted from the list. At step 908, an algorithm can be invoked to detect thread starvation. At step 910, when thread starvation is detected, an indicator can be output to the user interface to indicate to the user whether the thread has been starved. At step 912 the CPUT can continue running.

Figure 10:
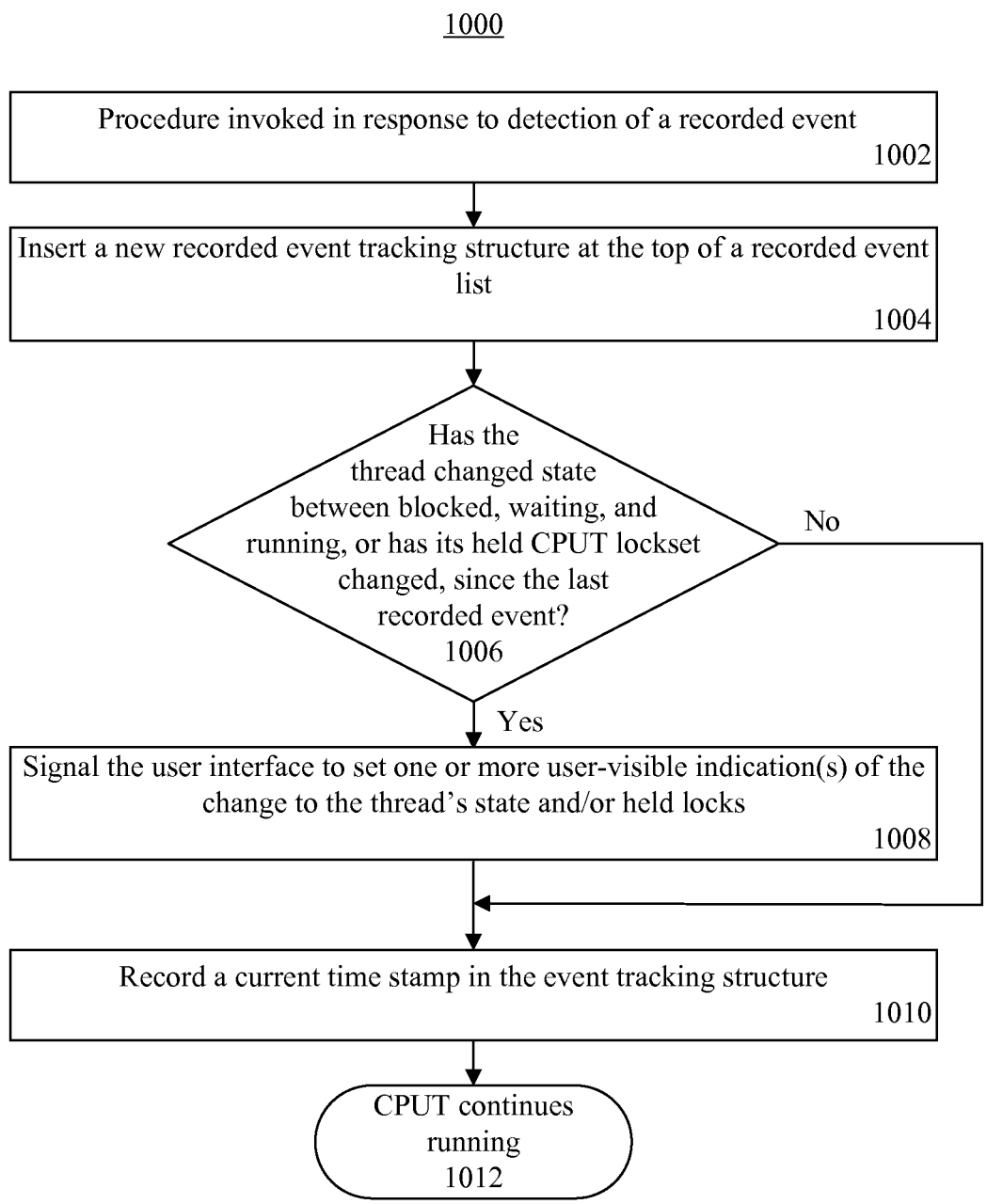

FIG. 10 is a flowchart illustrating a method 1000 of monitoring CPUT execution in accordance with another embodiment of the present invention. The method 1000 can be implemented to track recorded events, for example function entry and exit events.

At step 1002, a routine can be invoked in response to a detection of a recorded event. At step 1004, a new recorded event tracking structure can be inserted at the top of a recorded event list. In another embodiment, the new recorded event tracking structure can be inserted into the recorded event list in another suitable position that indicates the order in which the recorded event tracking structure was detected with respect to other recorded events.

Referring to decision box 1006, a determination can be made as to whether a specified field for a current thread has changed since the last recorded event. The current thread can be a thread that is presently running. The specified field can be a field comprising a flag that indicates that the current thread is waiting to acquire a synchronization object, a field comprising a flag that indicates that the current thread owns a CPUT lock, a field comprising a flag that indicates that the current thread owns a management lock, a field comprising a flag that indicates that the current thread is blocked for a serialized input/output operation, or any other field comprising a flag that may be of interest. In one embodiment, a single field can be used to indicate whether the current thread owns a CPUT lock and/or a management lock.

If a specified field has changed, at step 1008 a signal can be sent to the user interface in order to show one or more user-visible indication(s) of the change to the thread's state or to the set of CPUT locks and/or management locks the thread holds. In addition, the identifier(s) generated can be output to a computer-usable medium. At step 1010, a current time stamp can be recorded in the event tracking structure. At step 1012 the CPUT can continue running.

Figure 11:
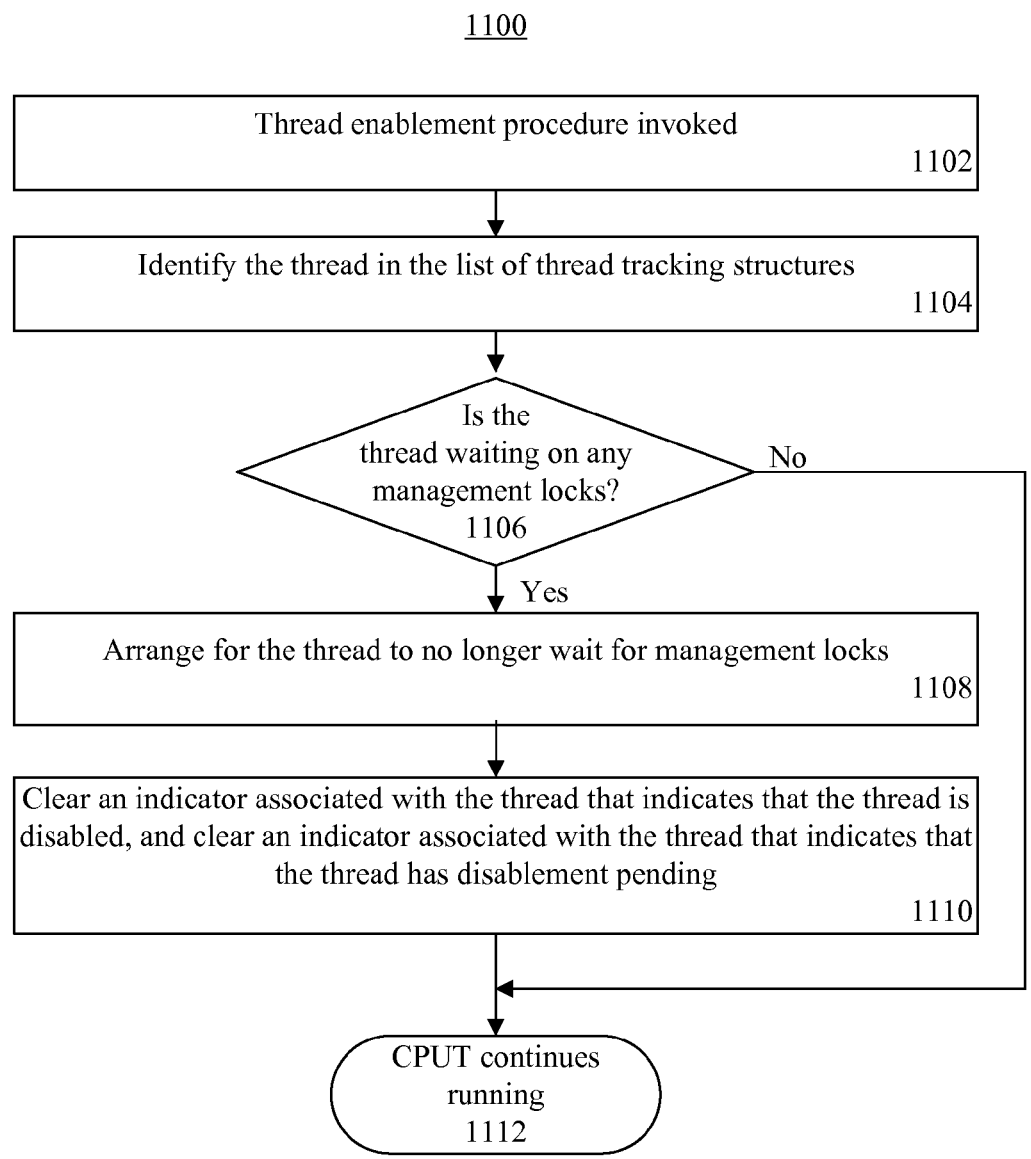

FIG. 11 is a flowchart illustrating a method 1100 of controlling CPUT execution in accordance with another embodiment of the present invention. The method 1100 can be implemented when enablement of a thread is arranged by the user via the user interface or programmatically. The method 1100 can be implemented while the CPUT continues to run.

At step 1102, a thread enablement procedure can be invoked. At step 1104, the thread being enabled can be identified in the list of thread tracking structures. Referring to decision box 1106, a determination can be made as to whether the thread is waiting on a management lock. If so, at step 1108 an arrangement can be made for the thread to no longer wait on the management lock.

For example, a management semaphore can be assigned to the thread and an associated counter can be decremented by one. If the maximum number of threads allowed to use the management semaphore has already been reached prior to the thread being granted access to the management semaphore, then access to the management semaphore by another thread can be rescinded. For instance, a thread that has a lower priority level than the subject thread can be identified and its access to the management semaphore can be rescinded. Management mutex objects can be managed in a similar manner, though a management mutex object typically is owned by only a single thread at any given time. In this regard, rather than a counter, ownership of a management mutex object can be controlled by a flag or other suitable identifier.

At step 1110, a disabled indicator and a disablement pending indicator can be cleared in the thread's tracking structure. At step 1112, the CPUT can continue running.

Figure 12:
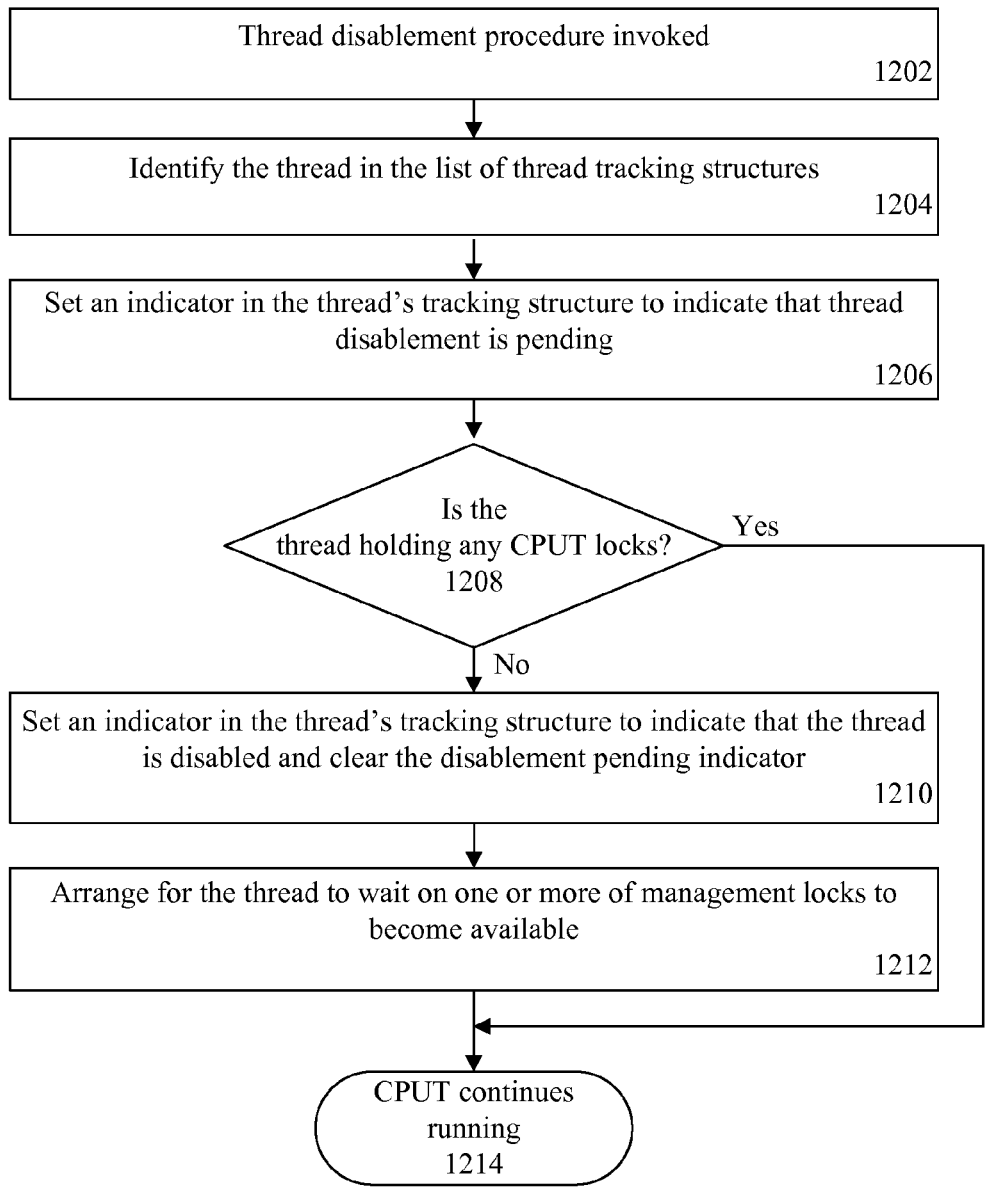

FIG. 12 is a flowchart illustrating a method 1200 of controlling CPUT execution in accordance with another embodiment of the present invention. The method 1200 can be implemented when disablement of a thread is arranged by the user via the user interface or programmatically. The method 1200 can be implemented while the CPUT continues to run.

At step 1202, a thread disablement procedure can be invoked. At step 1204, the thread being disabled can be identified in the list of thread tracking structures. At step 1206, an indicator can be set in the thread's tracking structure to indicate that thread disablement is pending. For example, a flag can be set.

Referring to decision box 1208, a determination can be made as to whether the thread is holding a CPUT lock. If not, at step 1210 an indicator in the thread's tracking structure can be cleared to indicate that the thread is disabled and the disablement pending indicator (e.g. a disablement flag) can be cleared.

At step 1212, an arrangement can be made for the thread to wait on a management lock to become available. For instance, an identifier corresponding to the thread can be entered into a queue of one or more threads that are waiting on the management semaphore lock. In one arrangement, the threads can be organized in the queue based on thread priority. Accordingly, a thread having the highest priority can be granted access to the management lock when the management lock becomes available. In some instances, multiple threads may have the same level of priority. In this case, the threads can be scheduled based on the order in which the threads entered the queue. At step 1214, the CPUT can continue running.

At this point it should be noted that any identifiers, indicators and flags, as well as any other information, generated by the routines described in FIGS. 2-12 can be communicated to the user interface for presentation to the user. In addition, any of these also can be provided to a computer-usable medium.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product, comprising:
   a computer usable storage memory having stored therein computer usable program code for performing runtime analysis and runtime control of a multithreaded computer program, the computer usable program code, which when executed by a computer hardware system, causes the computer hardware system to perform:
     identifying threads of the multithreaded computer program to be analyzed;
     folding, under control of a supervisor thread, a plurality of the identified threads together to be executed as a single folded thread;
     monitoring the execution of the folded thread to determine a status of the identified threads;
     presenting in a user interface at least one indicator corresponding to the determined status of the identified threads;
     receiving a user selection of a first of the identified threads and a second of the identified threads;
     assigning the first thread to assume a context of the second thread; and
     executing, during execution of the identified threads, the first thread in lieu of the second thread when the second thread would otherwise be executed but for the first thread assuming the context.

2. The computer program product of claim 1, wherein the identifying includes:
   identifying, in a list of folded threads, the first thread that currently is executing; and
   identifying a thread tracking structure associated with the first thread.

3. The computer program product of claim 1, wherein the computer usable program code further causes the computer hardware system to perform:
   storing state data of the first thread to a memory location.

4. The computer program product of claim 3, wherein
   the memory location is indicated by a thread tracking structure associated with the first thread.

5. The computer program product of claim 1, wherein the folding includes
  copying state data of the second thread, and
  applying the copied state data to be used as state data for the first thread.

6. The computer program product of claim 5, wherein
  the computer usable program code further causes the computer hardware system to perform:
    suspending the first thread; and
    suspending the second thread, and
  wherein the copying the state data is performed by a supervisor thread while both the first and second threads are suspended.

7. The computer program product of claim 6, wherein the computer usable program code further causes the computer hardware system to perform:
  re-initiating execution of the first thread.

8. The computer program product of claim 5, wherein the computer usable program code further causes the computer hardware system to perform:
  selecting as the second thread a thread that is next to the first thread in a list of folded threads.

9. The computer program product of claim 5, wherein
  the applying the copied state includes storing the copied state data to a memory location indicated by a thread tracking structure associated with the first thread.

* * * * *